(12) United States Patent
Maldonado et al.

(10) Patent No.: US 12,709,138 B2
(45) Date of Patent: Aug. 18, 2026

(54) STORAGE COMPARTMENT DOOR ASSEMBLY WITH PERIMETRAL HINGE ASSEMBLY

(71) Applicant: Rivian IP Holdings, LLC, Irvine, CA (US)

(72) Inventors: Julio Maldonado, Canton, MI (US); Carlos Chon, Aliso Viejo, CA (US); Arun Kumar, Corona, CA (US); Victor Rojas, Hermosa Beach, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 494 days.

(21) Appl. No.: 18/089,868

(22) Filed: Dec. 28, 2022

(65) Prior Publication Data

US 2024/0217319 A1 Jul. 4, 2024

(51) Int. Cl.
*B60J 5/04* (2006.01)

(52) U.S. Cl.
CPC .......... *B60J 5/0413* (2013.01); *B60J 5/0416* (2013.01); *B60J 5/0473* (2013.01)

(58) Field of Classification Search
CPC ...... B60J 5/0413; B60J 5/0416; B60J 5/0473; B60J 5/0491; B60J 5/0443; B60J 5/0422;
(Continued)

(56) References Cited

U.S. PATENT DOCUMENTS 5,281,780 A * 1/1994 Haland .................. B60J 5/0437 200/52 R
5,711,569 A * 1/1998 Sovoda ................ B62D 33/033 296/57.1

(Continued)

FOREIGN PATENT DOCUMENTS

CN 119348386 A * 1/2025 ............. B60R 11/00
DE 19542244 A1 * 1/1997 ............. F41A 27/10

(Continued)

OTHER PUBLICATIONS

Bauer et al. (DE 19542244 A1), machine translation (Year: 1997).*
Timmermann (WO 9912757 A1), machine translation (Year: 1999).*
Gebrüder (DE 202016100308 U1), EPO translation (Year: 2016).*

*Primary Examiner* — Vivek D Koppikar
*Assistant Examiner* — Wenwei Zhou
(74) *Attorney, Agent, or Firm* — BAKERHOSTETLER

(57) ABSTRACT

A door assembly for a vehicle including: an outer panel; an inner panel; and a perimetral hinge assembly including a perimetral hinge support member disposed between and coupled to the outer panel and the inner panel about an outer periphery of the door assembly. The perimetral hinge assembly further includes one or more connection members coupled to the perimetral hinge support member, where the one or more connection members are adapted to be coupled to a hinge mechanism coupled to a body of the vehicle. The perimetral hinge support member of the perimetral hinge assembly includes a tubular structure with a relatively wider dimension parallel to the outer panel and the inner panel of the door assembly and a relatively thinner dimension perpendicular to the outer panel and the inner panel of the door assembly.

20 Claims, 12 Drawing Sheets

(58) Field of Classification Search
CPC . B60J 5/0455; B60J 5/107; B60J 5/108; B60J 5/12; B60J 5/125; B60J 5/102; B60J 5/103; B60J 5/104; E05D 5/0207; E05D 5/08; E05D 7/00; E05D 11/00; E05D 15/04; B62D 33/023; B62D 33/027; B62D 33/0273; B62D 33/03; B62D 33/033; B60R 9/02; B60R 3/00
USPC ... 296/146.1, 146.6, 146.11, 151, 37.6, 37.1, 296/37.13, 14, 56, 57.1, 58; 16/387
See application file for complete search history.

(56) References Cited

U.S. PATENT DOCUMENTS 6,302,474 B1 * 10/2001 Drysdale ................ B60J 5/0441 296/5
6,761,293 B2 * 7/2004 Vasseur .................. B62D 43/08 414/463
2003/0122399 A1 * 7/2003 Seksaria .................. B60J 5/107 296/146.8
2003/0159359 A1 * 8/2003 Elsner .................... B60J 5/0412 49/502
2004/0104593 A1 * 6/2004 Nakagawa ............. B60J 5/0443 296/146.6
2005/0093327 A1 * 5/2005 Bruford ............... B62D 33/037 296/57.1
2006/0290166 A1 * 12/2006 Gehringhoff .......... B60J 5/0429 296/146.6
2009/0243319 A1 * 10/2009 Browne ................. B60N 3/023 296/1.02
2016/0076286 A1 * 3/2016 Holmes .................. B60J 5/0491 296/146.9
2017/0101138 A1 * 4/2017 Povinelli .............. B62D 35/001
2019/0061490 A1 * 2/2019 Getzschman .............. B60J 1/10
2019/0232765 A1 * 8/2019 Hoffman ................ B60J 5/0425
2020/0062185 A1 * 2/2020 Scaringe ................ B60J 5/0491
2021/0245817 A1 * 8/2021 Gibbs .................... B62D 33/03
2024/0100920 A1 * 3/2024 Choi ...................... B60J 5/0431
2025/0033710 A1 * 1/2025 Taylor ................ B62D 33/0273

FOREIGN PATENT DOCUMENTS

DE 202016100308 U1 * 5/2016 ............. B62D 33/03
WO WO-9912757 A1 * 3/1999 .............. B60J 5/042

* cited by examiner

STORAGE COMPARTMENT DOOR ASSEMBLY WITH PERIMETRAL HINGE ASSEMBLY

INTRODUCTION

The present disclosure relates generally to the automotive and storage fields.

Vehicles are equipped with various storage compartment door assemblies connected to the associated bodies with various hinge assemblies. For structural support, these hinge assemblies often include hinge support members, such as single or multi-piece casted or cantilevered hinge beams.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a storage compartment door assembly with a perimetral hinge assembly. This perimetral hinge assembly can accommodate a central storage recess within an interior surface of the storage compartment door assembly. The perimetral hinge assembly includes a hydroformed tubular frame or the like that avoids joints with fasteners between pivot structures and transfers loads from the storage compartment door assembly and the hinge body to the body of a vehicle or the like without the use of a support cable or the like. The perimetral hinge assembly provides optimized packaging, weight reduction, and uses readily accessible materials, e.g. steel tubing versus aluminum alloy castings. The perimetral hinge assembly significantly expands potential storage compartment door assembly configurations and the accommodation of storage recesses and space in the storage compartment door assemblies.

In one illustrative embodiment, the present disclosure provides a door assembly, such as a storage compartment door assembly, for a vehicle or the like including: an outer panel; an inner panel; and a perimetral hinge assembly including a perimetral hinge support member disposed between and coupled to the outer panel and the inner panel about an outer periphery of the door assembly. The outer panel includes an exterior body panel of the vehicle. Optionally, the outer panel further includes an outer attachment panel coupled to an interior surface of the exterior body panel. The inner panel includes an interior cover panel defining a storage recess surrounded by the perimetral member of the perimetral hinge assembly. The interior cover panel includes a pivoting or removable closure panel adapted to selectively cover the storage recess defined by the interior cover panel. The perimetral hinge assembly further includes one or more connection members coupled to the perimetral hinge support member, where the one or more connection members are adapted to be coupled to a hinge mechanism coupled to a body of the vehicle. The perimetral hinge support member of the perimetral hinge assembly includes a tubular structure formed by a hydroforming process. The perimetral hinge support member of the perimetral hinge assembly includes a tubular structure with a relatively wider dimension parallel to the outer panel and the inner panel of the door assembly and a relatively thinner dimension perpendicular to the outer panel and the inner panel of the door assembly.

In another illustrative embodiment, the present disclosure provides a perimetral hinge assembly for a door assembly, such as a storage compartment door assembly, for a vehicle or the like including: a perimetral hinge support member adapted to be disposed between and coupled to an outer panel and an inner panel of the door assembly about an outer periphery of the door assembly and one or more connection members coupled to the perimetral hinge support member, where the one or more connection members are adapted to be coupled to a hinge mechanism coupled to a body of the vehicle. The one or more connection members are disposed at an angle to the perimetral hinge support member. The perimetral hinge support member includes a tubular structure formed by a hydroforming process. The perimetral hinge support member includes a tubular structure with a relatively wider dimension parallel to the outer panel and the inner panel of the door assembly and a relatively thinner dimension perpendicular to the outer panel and the inner panel of the door assembly. The outer panel includes an exterior body panel of the vehicle. Optionally, the outer panel further includes an outer attachment panel coupled to an interior surface of the exterior body panel. The inner panel includes an interior cover panel defining a storage recess adapted to be surrounded by the perimetral member. The interior cover panel includes a pivoting or removable closure panel adapted to selectively cover the storage recess defined by the interior cover panel.

In a further illustrative embodiment, the present disclosure provides method for manufacturing a perimetral hinge assembly for a door assembly, such as a storage compartment door assembly, for a vehicle or the like including: hydroforming a perimetral hinge support member adapted to be disposed between and coupled to an outer panel and an inner panel of the door assembly about an outer periphery of the door assembly and hydroforming one or more connection members coupled to the perimetral hinge support member, where the one or more connection members are adapted to be coupled to a hinge mechanism coupled to a body of the vehicle. The one or more connection members are disposed at an angle to the perimetral hinge support member. The perimetral hinge support member includes a tubular structure. The perimetral hinge support member includes a tubular structure with a relatively wider dimension parallel to the outer panel and the inner panel of the door assembly and a relatively thinner dimension perpendicular to the outer panel and the inner panel of the door assembly.

BRIEF DESCRIPTION OF THE DRAWINGS

The present disclosure is illustrated and described with reference to the various drawings, in which like reference numbers are used to denote like assembly components and/or method steps, as appropriate, and in which.

All figures are shown with appropriate transparency to reveal internal structures where helpful.

DETAILED DESCRIPTION

Figure 1:
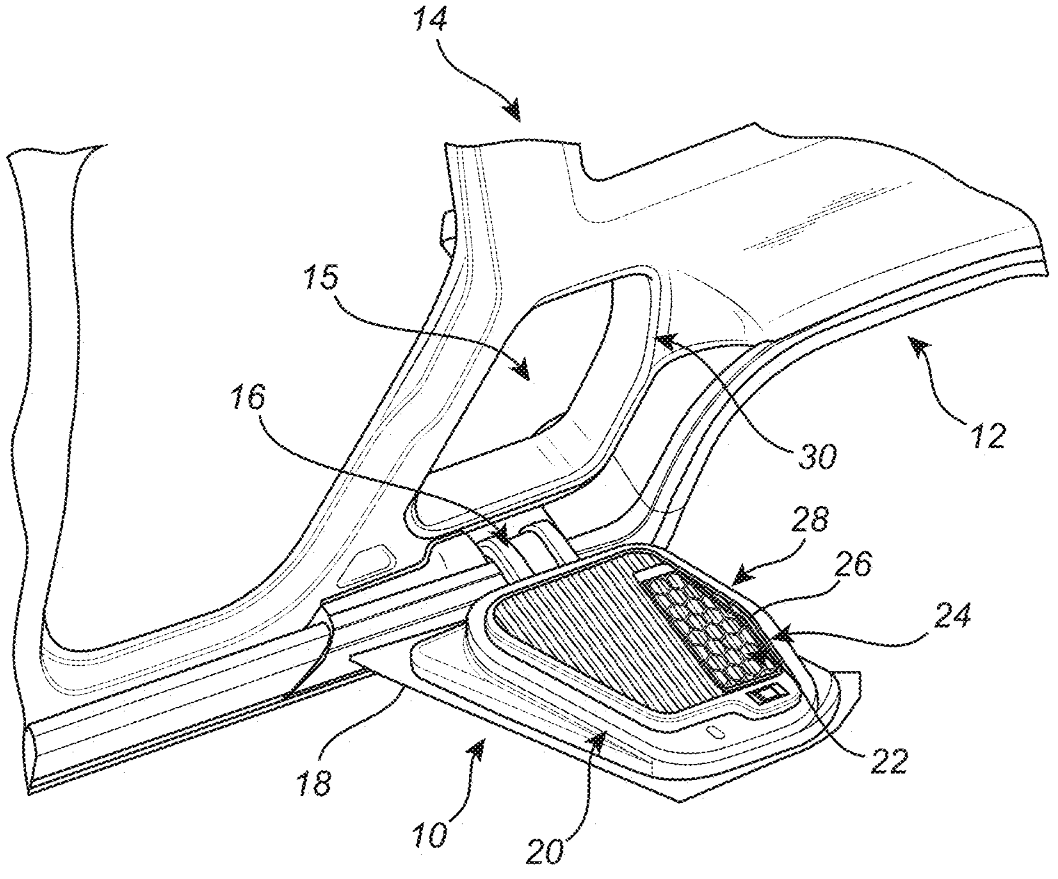
FIG. 1 is a perspective view of one illustrative embodiment of a storage compartment door assembly in an open configuration.

FIG. 1 is a perspective view of one illustrative embodiment of a storage compartment door assembly 10 in an open configuration. As contemplated herein, the storage compartment door assembly 10 is a door assembly that is hingedly coupled to the body 12 of a vehicle 14 at a lower portion of the door assembly, allowing it to pivot downwards. The storage compartment door assembly 10 is used to enclose a storage compartment 15 disposed in a side or the back of the vehicle 14, a bed disposed in the back of the vehicle 14, or the like. In such cases, the storage compartment door assembly 10 and associated hinge assembly 16 have sufficient structural strength that the storage compartment door assembly 10 can support a load placed on the storage compartment door assembly 10, such as by a user sitting or a standing on the storage compartment door assembly 10, a load being placed on the storage compartment door assembly 10, or the like. The storage compartment door assembly 10 may alternatively be hingedly coupled to the body 12 of the vehicle 14 at a side or upper portion of the storage compartment door assembly 10, allowing it to pivot sideways or upwards, and need not be designed to support a significant load. Further, the storage compartment door assembly 10 may be a general door assembly that encloses a generic space in the vehicle 14, such as an occupant space, and not necessarily a storage compartment 15.

The storage compartment door assembly 10 includes an outer panel 18 disposed on an exterior side of the body 12 of the vehicle 14 when the storage compartment door assembly 10 is closed and one or more inner panels 20 disposed on an interior side of the body 12 of the vehicle 14 relative to the outer panel 18 when the storage compartment assembly 10 is closed. The hinge assembly 16 may be directly coupled to either of the outer panel 18 and the one or more inner panels 20, and is indirectly coupled to both. The outer panel 18 may be an exterior body panel of the vehicle 14. An inner panel 20 of the storage compartment door assembly 10 includes one or more sealing surfaces 28 that correspond to and engage with one or more sealing surfaces 30 of the body 12 of the vehicle 14 when the storage compartment door assembly 10 is closed, providing a sealed storage compartment 15.

As illustrated, the storage compartment door assembly 10 defines a storage recess 22 within an interior portion thereof. An opening 24 and/or storage recess door 26 is/are disposed within an inner panel 20 coincident with the storage recess 22. When used, the storage recess door 26 may be pivotable or translatably coupled to the inner panel 20, or simply be removable from the inner panel 20 and the storage recess 22 can be accessed when the storage compartment door assembly 10 is open. When the opening 24 is used alone, the storage recess 22 serves to expand the storage compartment 15 of the vehicle 14 when the storage compartment door assembly 10 is closed.

Figure 2:
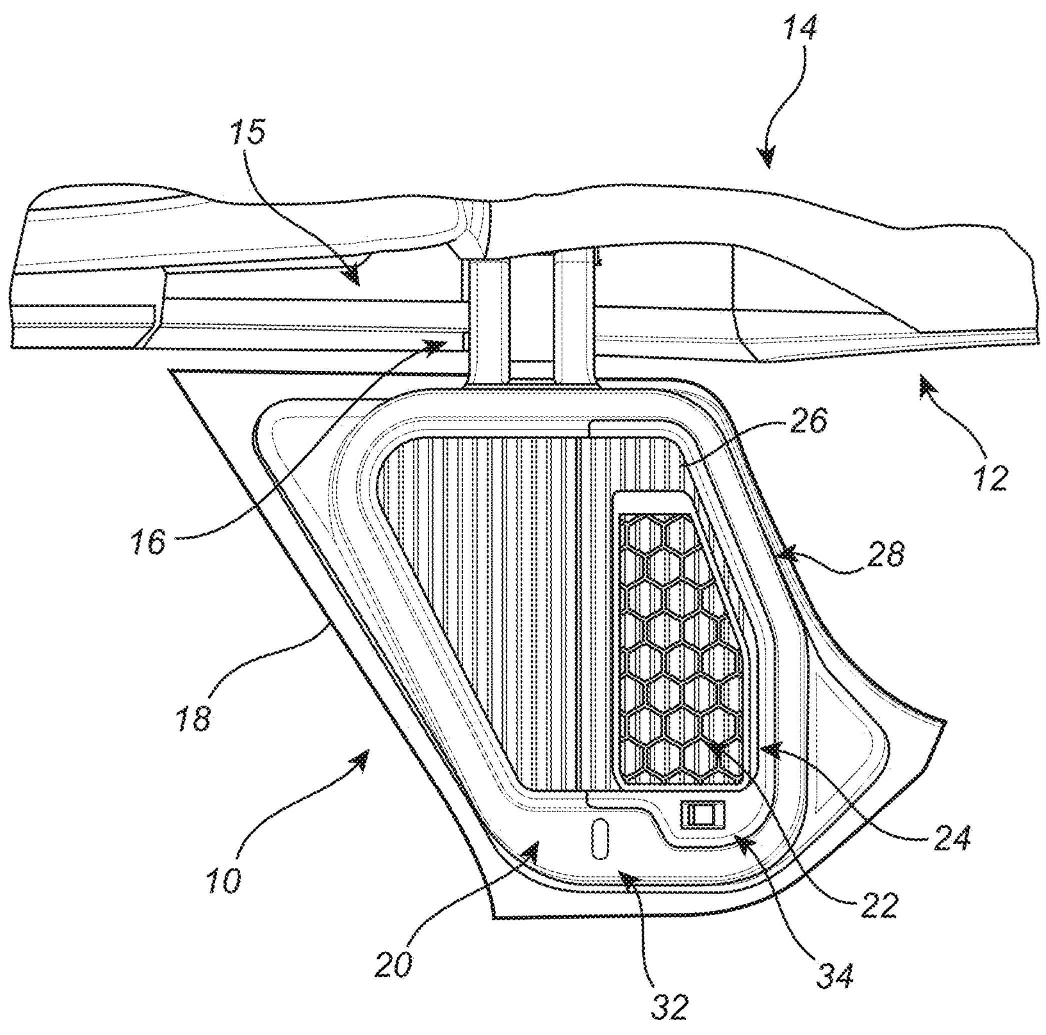
FIG. 2 is a top planar view of one illustrative embodiment of a storage compartment door assembly in an open configuration.

FIG. 2 is a top planar view of the storage compartment door assembly 10 in the open configuration. The storage compartment door assembly 10 is hingedly coupled to the body 12 of the vehicle 14 at the lower portion of the storage compartment door assembly 10, allowing it to pivot downwards. The storage compartment door assembly 10 is used to enclose the storage compartment 15 disposed, in this case, in the side of the vehicle 14. The storage compartment door assembly 10 and associated hinge assembly 16 have sufficient structural strength that the storage compartment door assembly 10 can support a load placed on the storage compartment door assembly 10, such as by a user sitting or a standing on the storage compartment door assembly 10, a load being placed on the storage compartment door assembly 10, or the like.

The storage compartment door assembly 10 includes the outer panel 18 disposed on the exterior side of the body 12 of the vehicle 14 when the storage compartment door assembly 10 is closed and one or more inner panels 20 disposed on the interior side of the body 12 of the vehicle 14 relative to the outer panel 18 when the storage compartment assembly 10 is closed. The hinge assembly 16 may be directly coupled to either of the outer panel 18 and the one or more inner panels 20, and is indirectly coupled to both. As illustrated, the outer panel 18 is an exterior body panel of the vehicle 14 and has any shape desired to conform with the surrounding vehicle structures and lines. An inner panel 20 of the storage compartment door assembly 10 includes one or more sealing surfaces 28 that correspond to and engage with one or more sealing surfaces 30 (FIG. 1) of the body 12 of the vehicle 14 when the storage compartment door assembly 10 is closed, providing a sealed storage compartment 15. A striker or striker receptacle 32 is provided to secure the storage compartment door assembly 10 in the closed configuration and may be released via an appropriate handle or electronic release disposed on the exterior of or within the vehicle 14.

The storage compartment door assembly 10 defines the storage recess 22 within the interior portion thereof. The opening 24 and/or storage recess door 26 is/are disposed within an inner panel 20 coincident with the storage recess 22. When used, the storage recess door 26 may be pivotable or translatably coupled to the inner panel 20, or simply be removable from the inner panel 20 and the storage recess 22 can be accessed when the storage compartment door assembly 10 is open. When the opening 24 is used alone, the storage recess 22 serves to expand the storage compartment 15 of the vehicle 14 when the storage compartment door assembly 10 is closed. As illustrated, the storage recess 22 may be formed in one or more of the inner panels 20, which may each/all be made of a metallic or plastic material. The outer panel 18 may be made of a metallic material. An innermost of the inner panels 20 and the storage recess door 26 may include any arrangement of textured surfaces that enhance the usability thereof when a user sits or steps on or a load is placed on the storage compartment door assembly 10.

Figure 3:
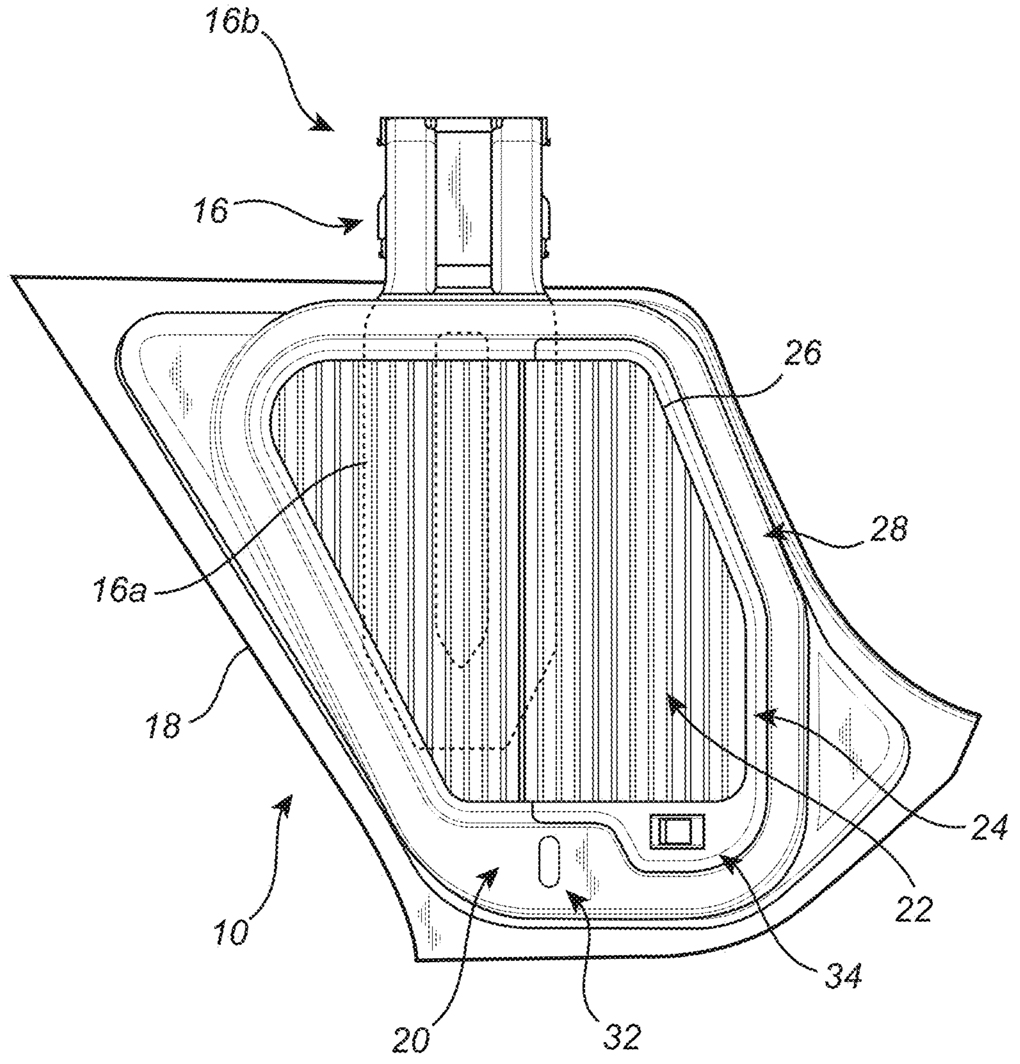
FIG. 3 is a top planar view of one illustrative embodiment of a storage compartment door assembly in an open configuration, highlighting the associated hinge assembly and hinge support member.

FIG. 3 is a top planar view of the storage compartment door assembly 10 in the open configuration, highlighting the hinge assembly 16 and an associated hinge support member 16*a*. The storage compartment door assembly 10 is hingedly coupled to the body 12 (FIGS. 1 and 2) of the vehicle 14 (FIGS. 1 and 2) at the lower portion of the storage compartment door assembly 10, allowing it to pivot downwards. The storage compartment door assembly 10 is used to enclose the storage compartment 15 (FIGS. 1 and 2) disposed, in this case, in the side of the vehicle 14. The storage compartment door assembly 10 and associated hinge assembly 16 have sufficient structural strength that the storage compartment door assembly 10 can support a load placed on the storage compartment door assembly 10, such as by a user sitting or a standing on the storage compartment door assembly 10, a load being placed on the storage compartment door assembly 10, or the like.

Here, the hinge assembly 16 includes one or more connection members 16*b* coupled to or integrally formed with the hinge support member 16*a*. The one or more connection members 16*b* may be axially aligned with or disposed at an angle to the hinge support member 16*a* and serve to couple the hinge support member 16*a* to a pivotable hinge assembly coupled to the body 12 of the vehicle 14. The hinge support member 16*a* acts as a cantilevered beam that transfers loads from across the storage compartment door assembly 10 to the one or more connection members 16*b* and the pivotable hinge assembly, preventing unwanted bending and deformation. As illustrated, the hinge support member 16*a*, which may be casted and substantially planar, occupies a significant portion of the storage compartment door assembly 10, being disposed between the outer panel 18 and the one or more inner panels 20, significantly limiting the available space for the storage recess 22 within the interior of the storage compartment door assembly 10.

The storage compartment door assembly 10 includes the outer panel 18 disposed on the exterior side of the body 12 of the vehicle 14 when the storage compartment door assembly 10 is closed and one or more inner panels 20 disposed on the interior side of the body 12 of the vehicle 14 relative to the outer panel 18 when the storage compartment assembly 10 is closed. The hinge assembly 16 may be directly coupled to either of the outer panel 18 and the one or more inner panels 20, and is indirectly coupled to both. As illustrated, the outer panel 18 is an exterior body panel of the vehicle 14 and has any shape desired to conform with the surrounding vehicle structures and lines. An inner panel 20 of the storage compartment door assembly 10 includes one or more sealing surfaces 28 that correspond to and engage with one or more sealing surfaces 30 (FIG. 1) of the body 12 of the vehicle 14 when the storage compartment door assembly 10 is closed, providing a sealed storage compartment 15. A striker or striker receptacle 32 is provided to secure the storage compartment door assembly 10 in the closed configuration and may be released via an appropriate handle or electronic release disposed on the exterior of or within the vehicle 14.

The storage compartment door assembly 10 defines the storage recess 22 within the interior portion thereof, limited by the placement of the hinge support member 16 of the hinge assembly 16. The opening 24 and/or storage recess door 26 is/are disposed within an inner panel 20 coincident with the storage recess 22. When used, the storage recess door 26 may be pivotable or translatably coupled to the inner panel 20, or simply be removable from the inner panel 20 and the storage recess 22 can be accessed when the storage compartment door assembly 10 is open. When the opening 24 is used alone, the storage recess 22 serves to expand the storage compartment 15 of the vehicle 14 when the storage compartment door assembly 10 is closed. As illustrated, the storage recess 22 may be formed in one or more of the inner panels 20, which may each/all be made of a metallic or plastic material. The outer panel 18 may be made of a metallic material. An innermost of the inner panels 20 and the storage recess door 26 may include any arrangement of textured surfaces that enhance the usability thereof when a user sits or steps on or a load is placed on the storage compartment door assembly 10.

Figure 4:
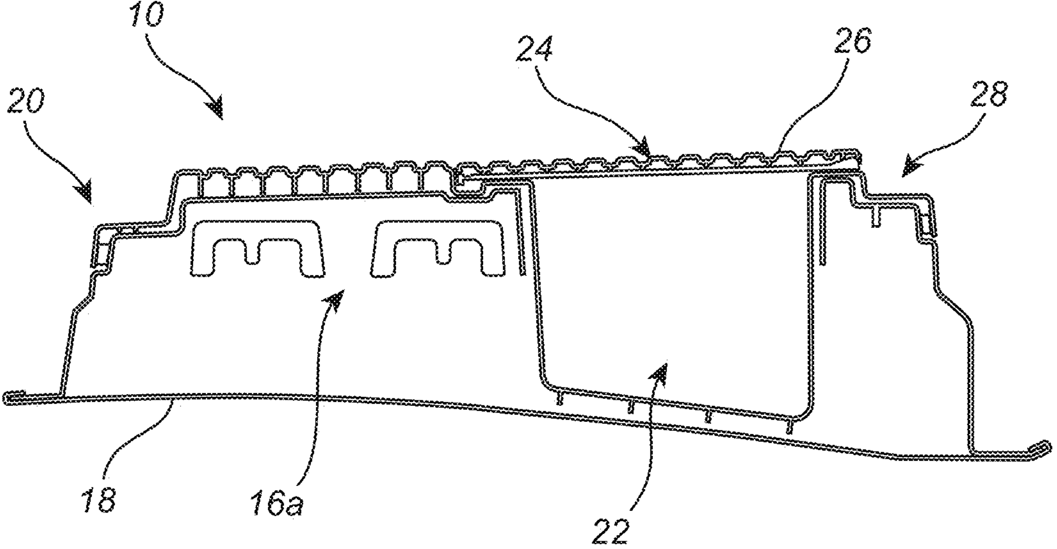
FIG. 4 is a cross-sectional side view of one illustrative embodiment of a storage compartment door assembly in an open configuration, highlighting the associated hinge support member.

FIG. 4 is a cross-sectional side view of the storage compartment door assembly 10 in the open configuration, highlighting the hinge support member 16*a*. As is seen, across a width of the storage compartment door assembly 10, the storage recess 22 is disposed adjacent to the hinge support member 16*a* between the outer panel 18 and the one or more inner panels 20. Thus, the size and position of the storage recess 22, as well as the associated opening 24 and/or door 26, are constrained by the size and position of the hinge support member 16*a*. As alluded to above, a relatively large hinge support member 16*a* is used to support any load applied to the storage compartment door assembly 10 if the use of a support cable, strut, or the like is to be avoided—such structures potentially obstructing user access to the storage recess 22 and storage compartment 15 (FIGS. 1 and 2). The hinge support member 16*a* typically spans the majority of a length of the storage compartment door assembly 10 to provide such support.

Figure 5:
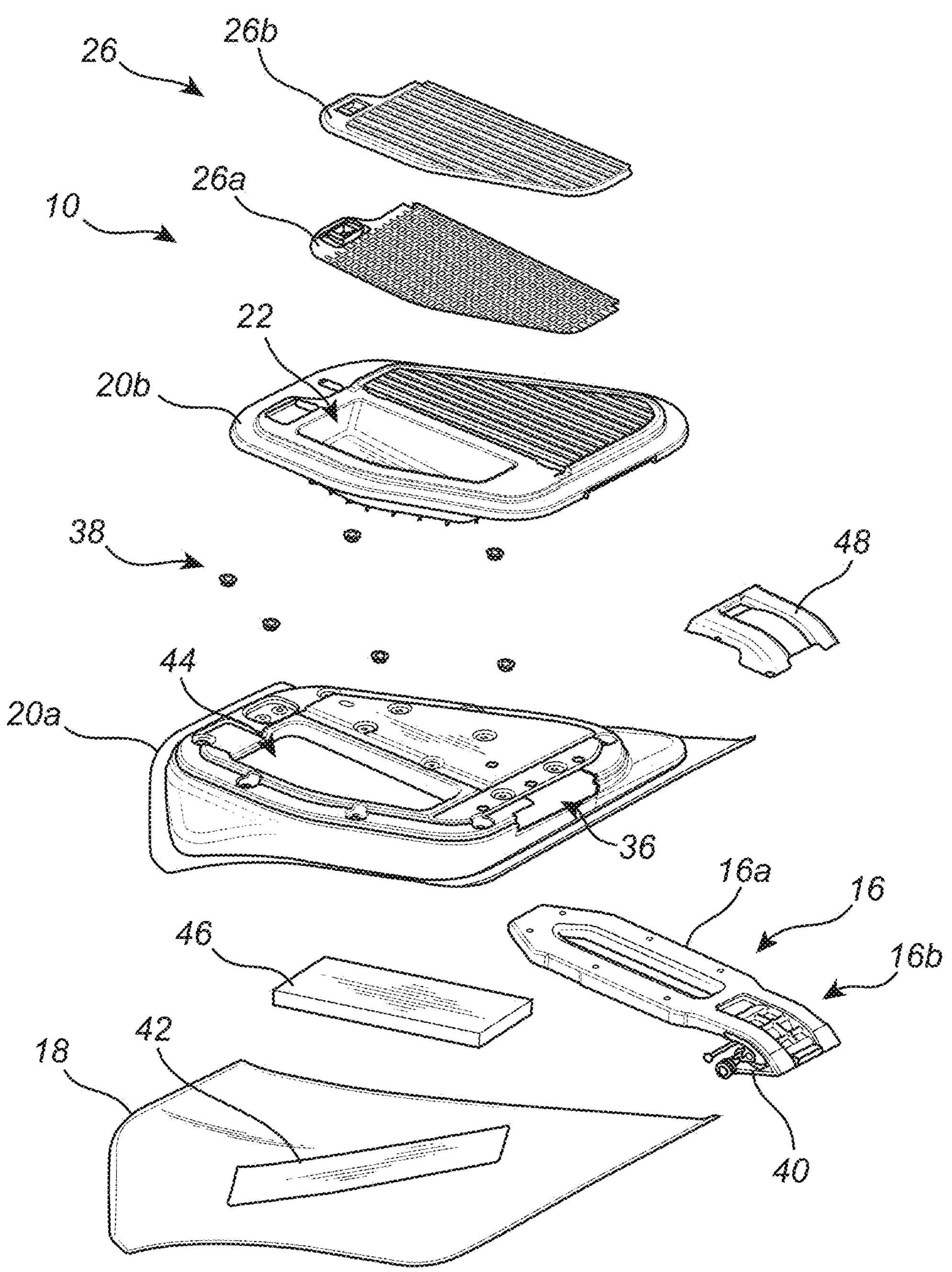
FIG. 5 is an exploded perspective view of one illustrative embodiment of a storage compartment door assembly in an open configuration, highlighting the associated hinge assembly and hinge support member.

FIG. 5 is an exploded perspective view of the storage compartment door assembly 10 in the open configuration, highlighting the hinge assembly 16 and hinge support member 16*a*. The storage compartment door assembly 10 includes the outer panel 18, which may be made from a metallic material, such as aluminum, that is joined to multiple inner panels 20*a* and 20*b*. A first inner panel 20*a* may be made (e.g. casted) from a metallic material, such as aluminum or magnesium. A second inner panel 20*b* may be made from a plastic material. The hinge support member 16*a* of the hinge assembly 16 is disposed through a slot 36 in the first inner panel 20*a* and is secured to an exterior surface of the first inner panel 20*a* using a plurality of bolts 38 or other fasteners. It will be readily apparent to those of ordinary skill in the art that other connection arrangements could be used equally, provided that the hinge support member 16*a* is securely fastened to the components of the storage compartment door assembly 10. The one or more connection members 16*b* of the hinge assembly 16 are coupled to or integrally formed with the hinge support member 16*a* and protrude from the slot 36 of the first inner panel 20*a* for appropriate connection to the pivotable hinge assembly 40 coupled to the body 12 (FIGS. 1 and 2) of the vehicle 14 (FIGS. 1 and 2). A butyl sound deadener 42 or the like may be disposed adjacent to the outer panel 18. In this illustrative embodiment, the first inner panel 20*a* includes a cutout 44 that is sized and positioned to receive the storage recess 22 defined by the second inner panel 20*b*. A piece of semi-closed cell high density foam 46 or the like is disposed beneath the storage recess 22 adjacent to the outer panel 18. The sound deadener 42 and the foam 46 serve to reduce sound and vibration associated with the storage compartment door assembly 10. A finish cover 48 is used to cover the one or more connection members 16*b* and the pivotable hinge assembly 40. As illustrated, a two-piece storage recess door 26 is used, including a first door member 26*a* and a second door member 26*b*, both of which may be made from a plastic material.

Figure 6:
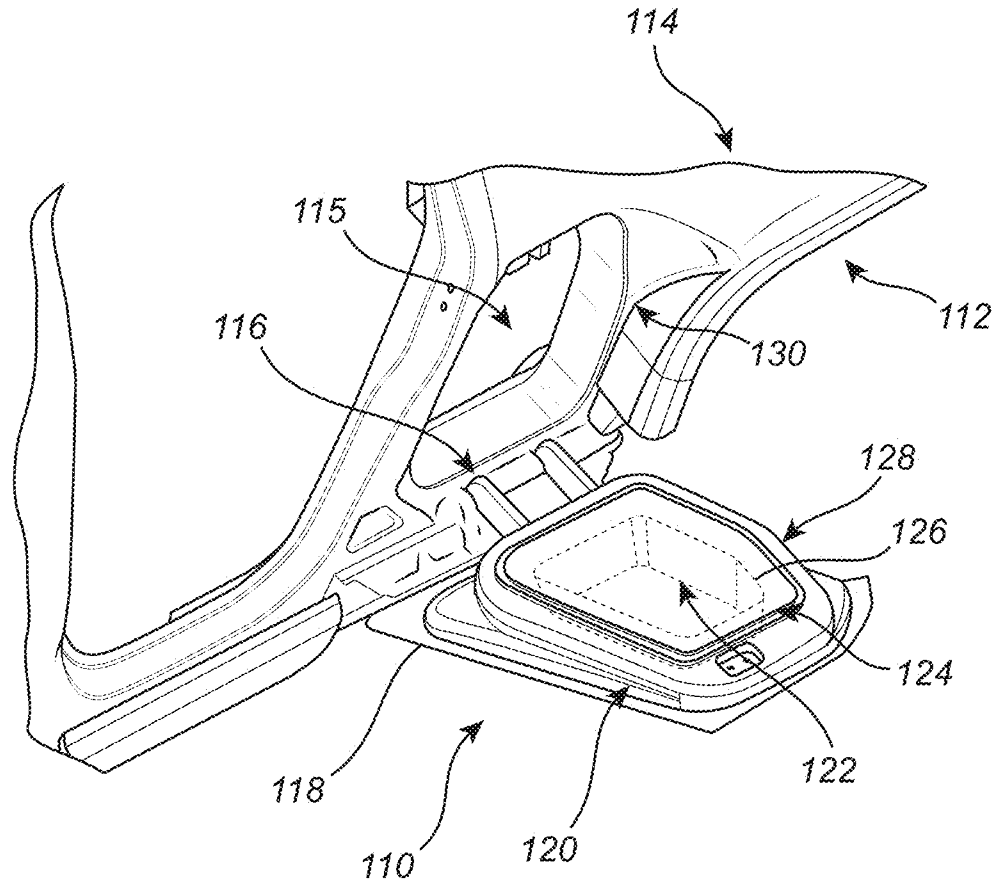
FIG. 6 is a perspective view of another illustrative embodiment of the storage compartment door assembly of the present disclosure in an open configuration.

FIG. 6 is a perspective view of another illustrative embodiment of the storage compartment door assembly 110 of the present disclosure in an open configuration. As contemplated herein, the storage compartment door assembly 110 is a door assembly that is hingedly coupled to the body 112 of a vehicle 114 at a lower portion of the door assembly, allowing it to pivot downwards. The storage compartment door assembly 110 is used to enclose a storage compartment 115 disposed in a side or the back of the vehicle 114, a bed disposed in the back of the vehicle 114, or the like. In such cases, the storage compartment door assembly 110 and associated hinge assembly 116 have sufficient structural strength that the storage compartment door assembly 110 can support a load placed on the storage compartment door assembly 110, such as by a user sitting or a standing on the storage compartment door assembly 110, a load being placed on the storage compartment door assembly 110, or the like. The storage compartment door assembly 110 may alternatively be hingedly coupled to the body 112 of the vehicle 114 at a side or upper portion of the storage compartment door assembly 110, allowing it to pivot sideways or upwards, and need not be designed to support a significant load. Further, the storage compartment door assembly 110 may be a general door assembly that encloses a generic space in the vehicle 114, such as an occupant space, and not necessarily a storage compartment 115.

The storage compartment door assembly 110 again includes an outer panel 118 disposed on an exterior side of the body 112 of the vehicle 114 when the storage compartment door assembly 110 is closed and one or more inner panels 120 disposed on an interior side of the body 112 of the vehicle 114 relative to the outer panel 118 when the storage compartment assembly 110 is closed. The hinge assembly 116 may be directly coupled to either of the outer panel 118 and the one or more inner panels 120, and is indirectly coupled to both. The outer panel 118 may be an exterior body panel of the vehicle 114. An inner panel 120 of the storage compartment door assembly 110 includes one or more sealing surfaces 128 that correspond to and engage with one or more sealing surfaces 130 of the body 112 of the vehicle 114 when the storage compartment door assembly 110 is closed, providing a sealed storage compartment 115.

As illustrated, the storage compartment door assembly 110 defines a storage recess 122 within an interior portion thereof. Here, the storage recess 122 occupies a majority of the central portion of the storage compartment door assembly 110, and is not limited to one side or the other. An opening 124 and/or storage recess door 126 is/are disposed within an inner panel 120 coincident with the storage recess 122. When used, the storage recess door 126 may be pivotable or translatably coupled to the inner panel 120, or simply be removable from the inner panel 120 and the storage recess 122 can be accessed when the storage compartment door assembly 110 is open. When the opening 124 is used alone, the storage recess 122 serves to expand the storage compartment 115 of the vehicle 114 when the storage compartment door assembly 110 is closed.

Figure 7:
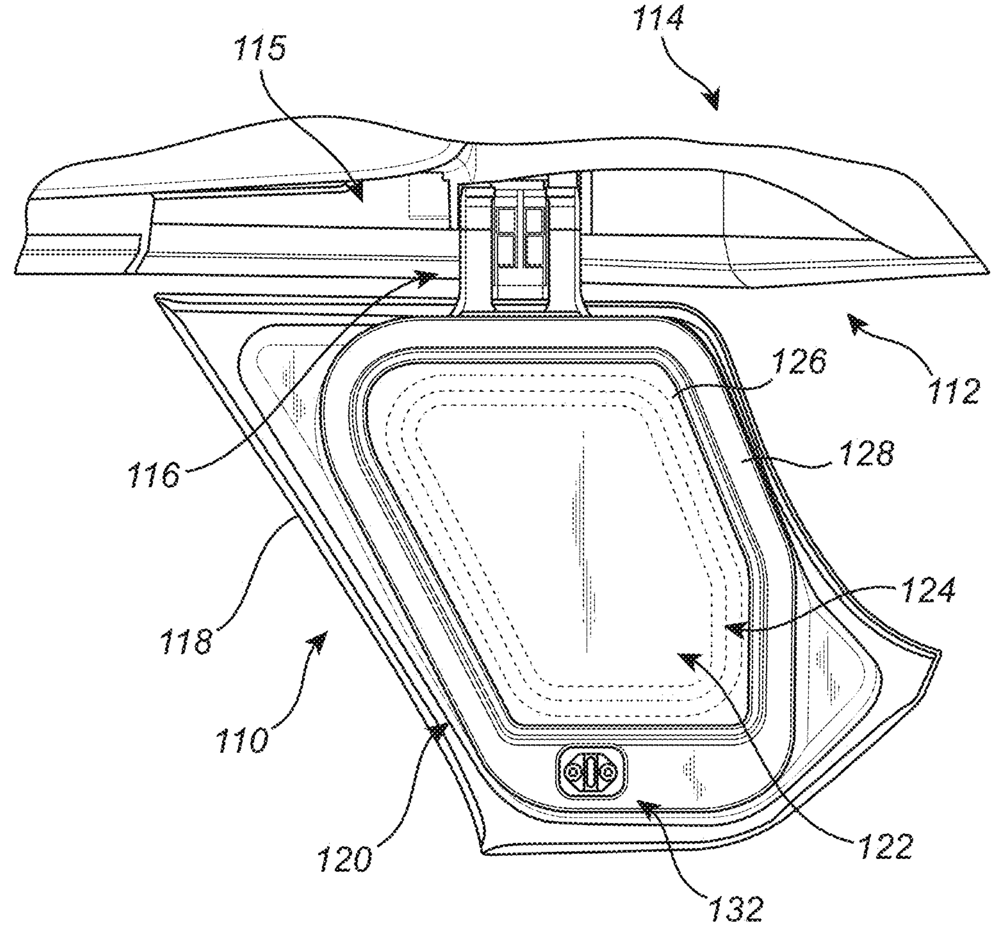
FIG. 7 is a top planar view of another illustrative embodiment of the storage compartment door assembly of the present disclosure in an open configuration.

FIG. 7 is a top planar view of the storage compartment door assembly 110 of the present disclosure in the open configuration. The storage compartment door assembly 110 is hingedly coupled to the body 112 of the vehicle 114 at the lower portion of the storage compartment door assembly 110, allowing it to pivot downwards. The storage compartment door assembly 110 is used to enclose the storage compartment 115 disposed, in this case, in the side of the vehicle 114. The storage compartment door assembly 110 and associated hinge assembly 116 have sufficient structural strength that the storage compartment door assembly 110 can support a load placed on the storage compartment door assembly 110, such as by a user sitting or a standing on the storage compartment door assembly 110, a load being placed on the storage compartment door assembly 110, or the like.

The storage compartment door assembly 110 includes the outer panel 118 disposed on the exterior side of the body 112 of the vehicle 114 when the storage compartment door assembly 110 is closed and one or more inner panels 120 disposed on the interior side of the body 112 of the vehicle 114 relative to the outer panel 118 when the storage compartment assembly 110 is closed. The hinge assembly 116 may be directly coupled to either of the outer panel 118 and the one or more inner panels 120, and is indirectly coupled to both. As illustrated, the outer panel 118 is an exterior body panel of the vehicle 114 and has any shape desired to conform with the surrounding vehicle structures and lines. An inner panel 120 of the storage compartment door assembly 110 includes one or more sealing surfaces 128 that correspond to and engage with one or more sealing surfaces 130 (FIG. 6) of the body 112 of the vehicle 114 when the storage compartment door assembly 110 is closed, providing a sealed storage compartment 115. A striker or striker receptacle 132 is provided to secure the storage compartment door assembly 110 in the closed configuration and may be released via an appropriate handle or electronic release disposed on the exterior of or within the vehicle 114.

The storage compartment door assembly 110 defines the storage recess 122 within the interior portion thereof. The opening 124 and/or storage recess door 126 is/are disposed within an inner panel 120 coincident with the storage recess 122. When used, the storage recess door 126 may be pivotable or translatably coupled to the inner panel 120, or simply be removable from the inner panel 120 and the storage recess 122 can be accessed when the storage compartment door assembly 110 is open. When the opening 124 is used alone, the storage recess 122 serves to expand the storage compartment 115 of the vehicle 114 when the storage compartment door assembly 110 is closed. As illustrated, the storage recess 122 may be formed in one or more of the inner panels 20, which may each/all be made of a metallic or plastic material. The outer panel 118 may be made of a metallic material. An innermost of the inner panels 120 and the storage recess door 126 may include any arrangement of textured surfaces that enhance the usability thereof when a user sits or steps on or a load is placed on the storage compartment door assembly 110.

Figure 8:
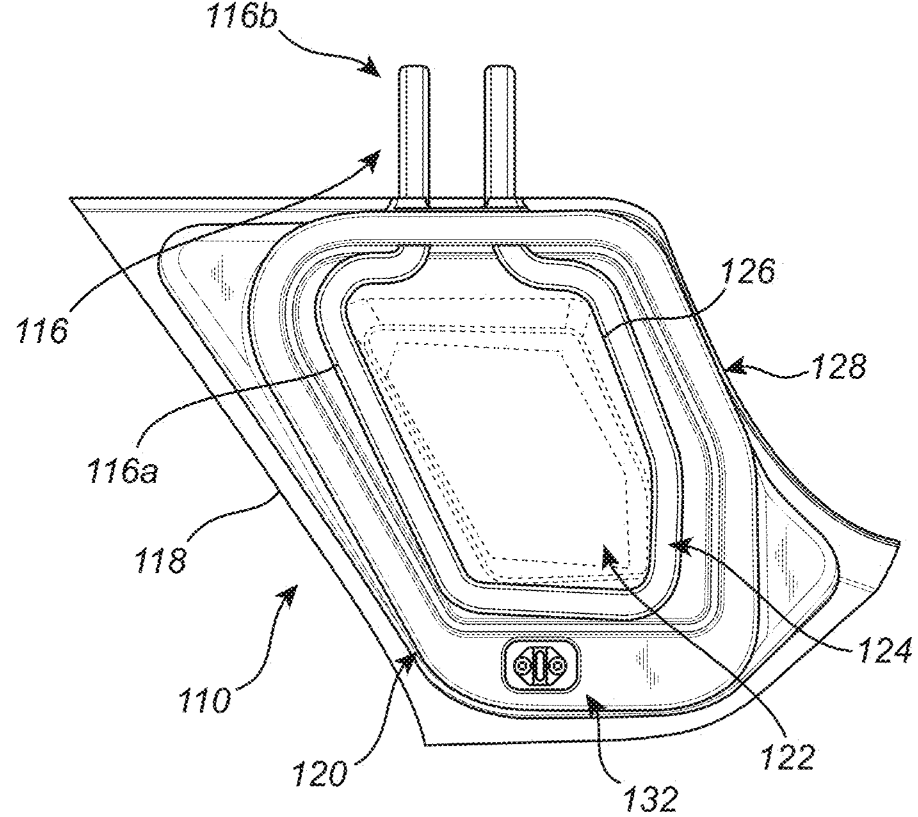
FIG. 8 is a top planar view of another illustrative embodiment of the storage compartment door assembly of the present disclosure in an open configuration, highlighting the associated perimetral hinge assembly and perimetral hinge support member.

FIG. 8 is a top planar view of the storage compartment door assembly 110 of the present disclosure in the open configuration, highlighting the perimetral hinge assembly 116 and perimetral hinge support member 116*a*. The storage compartment door assembly 110 is hingedly coupled to the body 112 (FIGS. 6 and 7) of the vehicle 114 (FIGS. 6 and 7) at the lower portion of the storage compartment door assembly 110, allowing it to pivot downwards. The storage compartment door assembly 110 is used to enclose the storage compartment 115 (FIGS. 6 and 7) disposed, in this case, in the side of the vehicle 114. The storage compartment door assembly 110 and associated perimetral hinge assembly 116 have sufficient structural strength that the storage compartment door assembly 110 can support a load placed on the storage compartment door assembly 110, such as by a user sitting or a standing on the storage compartment door assembly 110, a load being placed on the storage compartment door assembly 110, or the like.

Here, the perimetral hinge assembly 116 again includes one or more connection members **116*b* coupled to or integrally formed with the perimetral hinge support member 116*a*. The one or more connection members 116*b* may be axially aligned with or disposed at an angle to the perimetral hinge support member 116*a* and serve to couple the perimetral hinge support member 116*a* to a pivotable hinge assembly coupled to the body 112 of the vehicle 114. The perimetral hinge support member 116*a* acts as a cantilevered beam that transfers loads from across the storage compartment door assembly 110 to the one or more connection members 116*b* and the pivotable hinge assembly, preventing unwanted bending and deformation. As illustrated, the perimetral hinge support member 116*a*, which may be tubular and hydroformed, occupies only the perimeter of the storage compartment door assembly 110, being disposed between the outer panel 118 and the one or more inner panels 120, significantly increasing the available space for the storage recess 122 within the interior of the storage compartment door assembly 110. As is illustrated, the perimetral hinge support member 116*a* substantially surrounds the storage recess 122**.

The storage compartment door assembly 110 includes the outer panel 118 disposed on the exterior side of the body 112 of the vehicle 114 when the storage compartment door assembly 110 is closed and one or more inner panels 120 disposed on the interior side of the body 112 of the vehicle 114 relative to the outer panel 118 when the storage compartment assembly 110 is closed. The hinge assembly 116 may be directly coupled to either of the outer panel 118 and the one or more inner panels 120, and is indirectly coupled to both. As illustrated, the outer panel 118 is an exterior body panel of the vehicle 114 and has any shape desired to conform with the surrounding vehicle structures and lines. An inner panel 120 of the storage compartment door assembly 110 includes one or more sealing surfaces 128 that correspond to and engage with one or more sealing surfaces 130 (FIG. 6) of the body 112 of the vehicle 114 when the storage compartment door assembly 110 is closed, providing a sealed storage compartment 115. A striker or striker receptacle 132 is provided to secure the storage compartment door assembly 110 in the closed configuration and may be released via an appropriate handle or electronic release disposed on the exterior of or within the vehicle 114.

The storage compartment door assembly 110 defines the storage recess 122 within the interior portion thereof, within the perimetral hinge support member **116*a* of the hinge assembly 116. The opening 124 and/or storage recess door 126 is/are disposed within an inner panel 120 coincident with the storage recess 122. When used, the storage recess door 126 may be pivotable or translatably coupled to the inner panel 120, or simply be removable from the inner panel 120 and the storage recess 122 can be accessed when the storage compartment door assembly 110 is open. When the opening 124 is used alone, the storage recess 122 serves to expand the storage compartment 115 of the vehicle 114 when the storage compartment door assembly 110 is closed. As illustrated, the storage recess 122 may be formed in one or more of the inner panels 120, which may each/all be made of a metallic or plastic material. The outer panel 118 may be made of a metallic material. An innermost of the inner panels 120 and the storage recess door 126 may include any arrangement of textured surfaces that enhance the usability thereof when a user sits or steps on or a load is placed on the storage compartment door assembly 110**.

Figure 9:
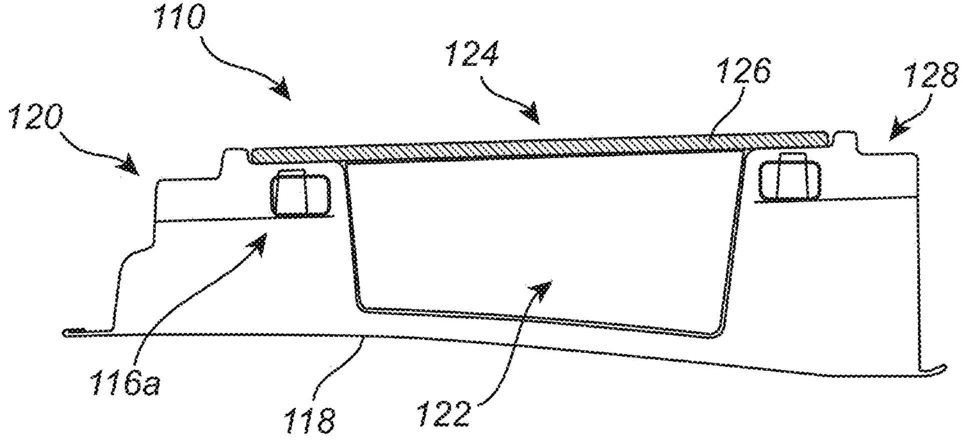
FIG. 9 is a cross-sectional side view of another illustrative embodiment of the storage compartment door assembly of the present disclosure in an open configuration, highlighting the associated perimetral hinge support member.

FIG. 9 is a cross-sectional side view of the storage compartment door assembly 110 of the present disclosure in the open configuration, highlighting the perimetral hinge support member **116*a*. As is seen, across a width of the storage compartment door assembly 110, the storage recess 122 is disposed within the perimetral hinge support member 116*a* between the outer panel 118 and the one or more inner panels 120. Thus, the size and position of the storage recess 122, as well as the associated opening 124 and/or door 126, are free to occupy the entire internal space defined by the perimetral hinge support member 116*a*. Because the perimetral hinge support member 116*a* can occupy the entire perimeter of the storage compartment door assembly 110, it can readily support any load applied to the storage compartment door assembly 110**, without the use of a support cable, strut, or the like.

Figure 10:
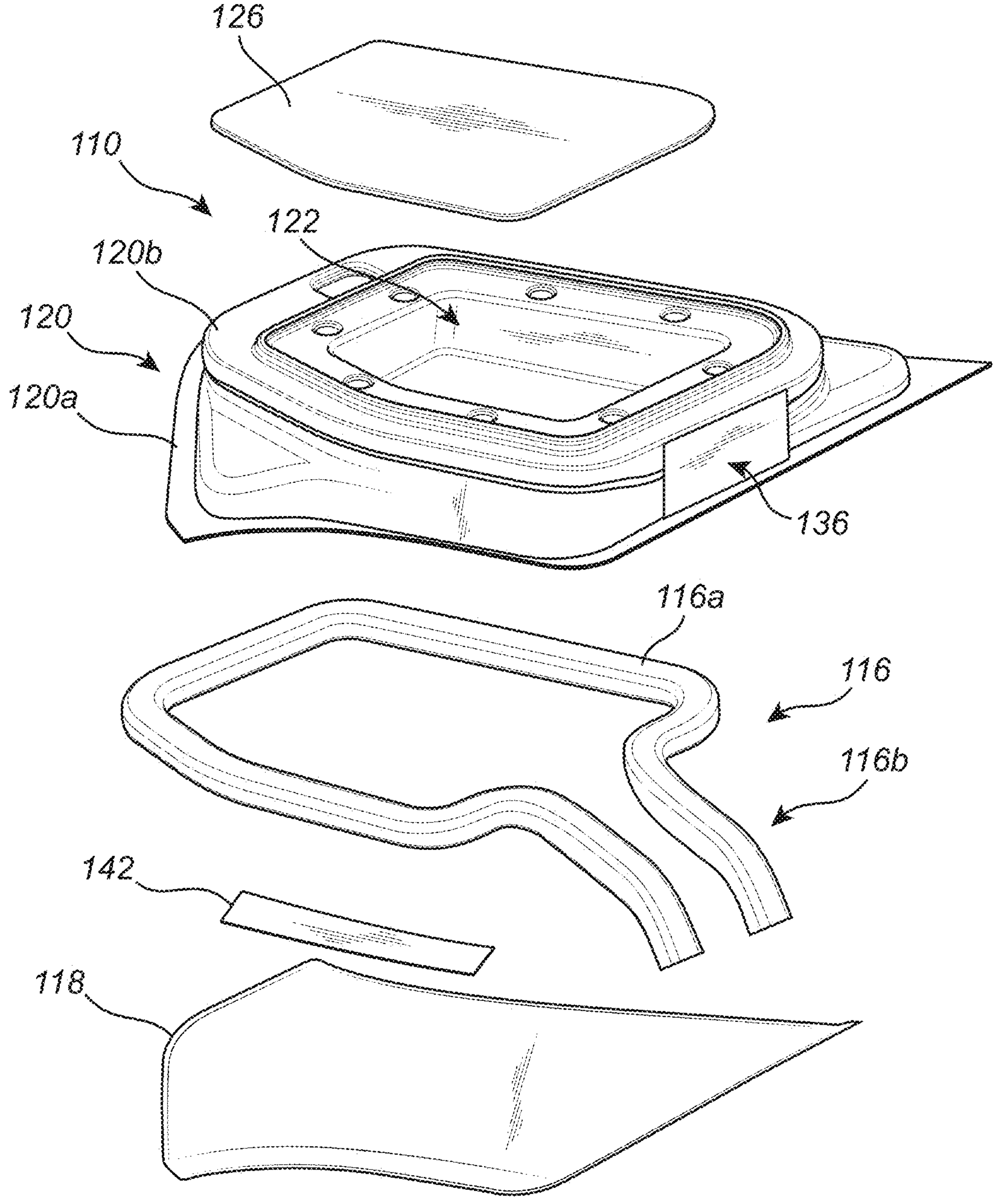
FIG. 10 is an exploded perspective view of another illustrative embodiment of the storage compartment door assembly of the present disclosure in an open configuration, highlighting the associated perimetral hinge assembly and perimetral hinge support member.

FIG. 10 is an exploded perspective view of one illustrative embodiment of the storage compartment door assembly 110 of the present disclosure in the open configuration, highlighting the perimetral hinge assembly 116 and perimetral hinge support member **116*a*. The storage compartment door assembly 110 includes the outer panel 118, which may be made from a metallic material, such as aluminum, that is joined to the one or more inner panels 120. A first inner panel 120*a* may be made (e.g. casted) from a metallic material, such as aluminum or magnesium. A second inner panel 120*b* may be made from a plastic material. The perimetral hinge support member 116*a* of the perimetral hinge assembly 116 is disposed through a slot 136 in the first inner panel 120*a* and/or second inner panel 120*b* and is secured to an exterior surface of the first inner panel 120*a*, and optionally the second inner panel 120*b*, using a plurality of bolts or other fasteners (not illustrated). It will be readily apparent to those of ordinary skill in the art that other connection arrangements could be used equally, provided that the perimetral hinge support member 116*a* is securely fastened to the components of the storage compartment door assembly 110. The one or more connection members 116*b* of the perimetral hinge assembly 116 are coupled to or integrally formed with the perimetral hinge support member 116*a* and protrude from the slot 136 of the first inner panel 120*a* and/or second inner panel 120*b* for appropriate connection to the pivotable hinge assembly (not illustrated) coupled to the body 12 (FIGS. 6 and 7) of the vehicle 14 (FIGS. 6 and 7). A butyl sound deadener 142 or the like may be disposed adjacent to the outer panel 118. In this illustrative embodiment, the first inner panel 120*a* includes a cutout (not illustrated) that is sized and positioned to receive the storage recess 122 defined by the second inner panel 120*b*. The sound deadener 142 serves to reduce sound and vibration associated with the storage compartment door assembly 110. A finish cover (not illustrated) may be used to cover the one or more connection members 116*b* and the pivotable hinge assembly. As illustrated, a removable storage recess door 126** is provided.

Figure 11:
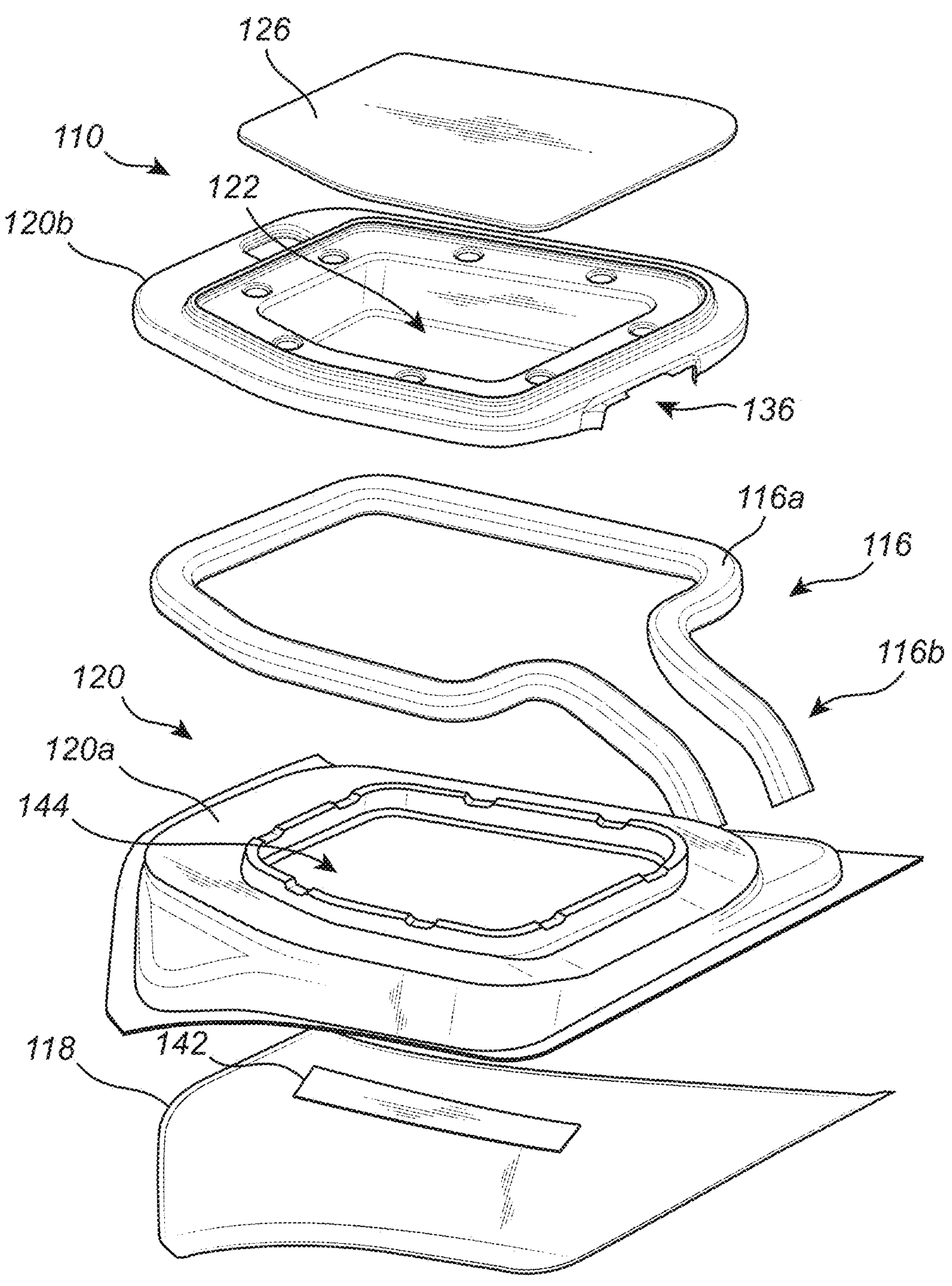
FIG. 11 is an exploded perspective view of a further illustrative embodiment of the storage compartment door assembly of the present disclosure in an open configuration, highlighting the associated perimetral hinge assembly and perimetral hinge support member.

FIG. 11 is an exploded perspective view of another illustrative embodiment of the storage compartment door assembly 110 of the present disclosure in the open configuration, highlighting the perimetral hinge assembly 116 and perimetral hinge support member 116*a*. The storage compartment door assembly 110 again includes the outer panel 118, which may be made from a metallic material, such as aluminum, that is joined to the one or more inner panels 120. A first inner panel 120*a* may be made (e.g. casted) from a metallic material, such as aluminum or magnesium. A second inner panel 120*b* may be made from a plastic material. The perimetral hinge support member 116*a* of the perimetral hinge assembly 116 is disposed through a slot 136 in the second inner panel 120*b* and is secured to an exterior surface of the first inner panel 120*a*, and optionally the second inner panel 120*b*, using a plurality of bolts or other fasteners (not illustrated). It will be readily apparent to those of ordinary skill in the art that other connection arrangements could be used equally, provided that the perimetral hinge support member 116*a* is securely fastened to the components of the storage compartment door assembly 110. The one or more connection members 116*b* of the perimetral hinge assembly 116 are coupled to or integrally formed with the perimetral hinge support member 116*a* and protrude from the slot 136 of the second inner panel 120*b* for appropriate connection to the pivotable hinge assembly (not illustrated) coupled to the body 12 (FIGS. 6 and 7) of the vehicle 14 (FIGS. 6 and 7). A butyl sound deadener 142 or the like may be disposed adjacent to the outer panel 118. In this illustrative embodiment, the first inner panel 120*a* includes a cutout 144 that is sized and positioned to receive the storage recess 122 defined by the second inner panel 120*b*. The sound deadener 142 serves to reduce sound and vibration associated with the storage compartment door assembly 110. A finish cover (not illustrated) may be used to cover the one or more connection members 116*b* and the pivotable hinge assembly. As illustrated, a removable storage recess door 126 is provided.

Figure 12:
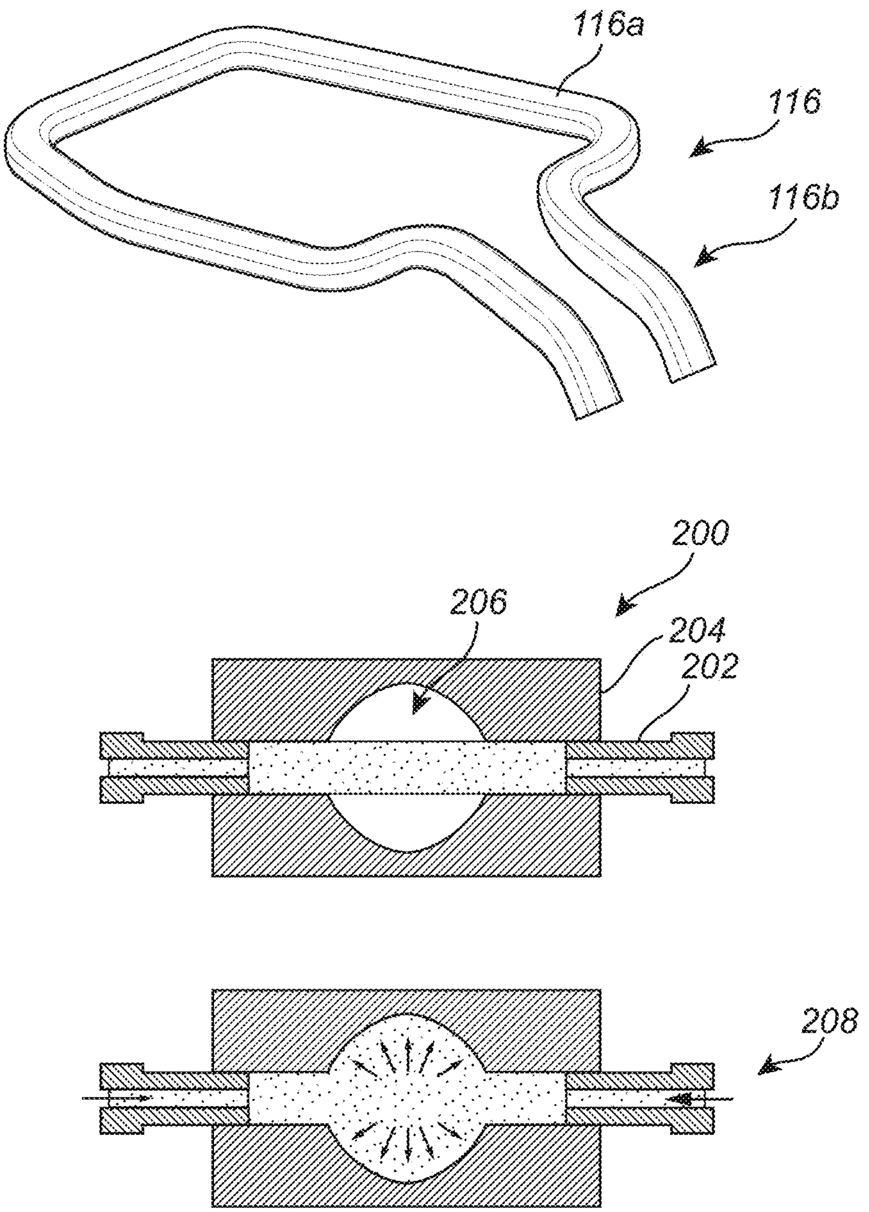
FIG. 12 is a perspective view of one illustrative embodiment of the perimetral hinge assembly and perimetral hinge support member of the present disclosure, as well as one illustrative embodiment of the associated hydroforming manufacturing method.

FIG. 12 is a perspective view of one illustrative embodiment of the perimetral hinge assembly 116, the perimetral hinge support member 116*a*, and the one or more connection members 116*b* of the present disclosure, as well as one illustrative embodiment of the associated hydroforming manufacturing method 200. The perimetral hinge assembly 116 may be a one-piece structure or include multiple interconnected pieces. For example, the perimetral hinge support member 116*a* may be coupled to the one or more connection members 116*b*, or these components may be integrally formed, with a connection member 116*b* being disposed at leach end of a continuous perimetral hinge support member 116*a* that generally conforms to the shape of the outer periphery of the storage compartment door assembly 110 (FIGS. 6-11). Accordingly, the perimetral hinge support member 116*a* may have any number and arrangement of substantially straight and substantially curved sections, forming a structure that may accommodate the storage recess 112 (FIGS. 6-11) therein. The one or more connection members 116*b* may be co-planar with the perimetral hinge support member 116*a*, or the one or more connection members 116*b* may be disposed at an angle to the perimetral hinge support member 116*a*. In general, the perimetral hinge support member 116*a* is a tubular structure. The one or more connection structures 116*b* may also be tubular structures. For strength, the perimetral hinge support member 116*a* may have a relatively wider dimension running parallel to the outer panel 118 (FIGS. 6-11) and the inner panel(s) 120 (FIGS. 6-11) and the inner panel(s) 120 of the storage compartment door assembly 110 and a relatively thinner dimension running perpendicular to the outer panel 118 and the inner panel(s) 120 of the storage compartment door assembly 110. Thus, a relatively larger (i.e., in terms of support area) flat side of the perimetral hinge support member 116*a* engages the inner panel(s) 120. The one or more connection members 116*b* may have a wider dimension/thinner dimension profile that is at an angle (i.e., orthogonal) to the perimetral hinge support member 116*a* for greater strength in securing the perimetral hinge assembly 116 to the vehicle structures. In this case, the one or more connection members 116*b* are joined to the perimetral hinge support member 116*a* via appropriate transition sections that join the various profiles. In some examples, the perimetral hinge assembly 116 is manufactured from a metallic material, such as steel.

The perimetral hinge assembly 116 may be manufactured using a hydroforming process 200 in which a tubular member 202 is disposed in a forming tool 204 having an internal cavity 206 with the desired external shape of the finished component. A pressurized fluid flow 208 is then introduced into the tubular member 202, expanding it to conform to the shape of the internal cavity 206.

Thus, the present disclosure provides a storage compartment door assembly with a perimetral hinge assembly. This perimetral hinge assembly can accommodate a central storage recess within an interior surface of the storage compartment door assembly. The perimetral hinge assembly includes a hydroformed tubular frame or the like that avoids joints with fasteners between pivot structures and transfers loads from the storage compartment door assembly and the hinge body to the body of a vehicle or the like without the use of a support cable or the like. The perimetral hinge assembly provides optimized packaging, weight reduction, and uses readily accessible materials, e.g. steel tubing versus aluminum alloy castings. The perimetral hinge assembly significantly expands potential storage compartment door assembly configurations and the accommodation of storage recesses and space in the storage compartment door assemblies.

Although the present disclosure is illustrated and described herein with reference to illustrative embodiments and specific examples of the storage compartment door assembly and perimetral hinge assembly provided, it will be readily apparent to those of ordinary skill in the art that other embodiments and examples may perform similar functions and/or achieve like results. All such equivalent embodiment and examples are within the spirit and scope of the present disclosure and are intended to be covered by the following non-limiting claims for all purposes.

What is claimed is:

1. A door assembly for a vehicle, the door assembly comprising:

- an outer panel comprising a shape configured to conform with a surrounding vehicle structure of the vehicle in response to the outer panel being in a closed configuration and covering a storage compartment on a side of the vehicle;
- an inner panel configured to enclose the storage compartment in the closed configuration; and
- a perimetral hinge assembly comprising:
  - a perimetral hinge support member disposed between and coupled to the outer panel and the inner panel, the perimetral hinge assembly coupled to the vehicle to pivot the outer panel and the inner panel downward away from the storage compartment, and one or more connection members coupled to the perimetral hinge support member and configured to couple to a pivotable hinge assembly of the vehicle; and a finish cover that covers the one or more connection members.

2. The door assembly of claim 1, wherein the outer panel comprises an exterior body panel of the vehicle.

3. The door assembly of claim 2, wherein the outer panel further comprises an outer attachment panel coupled to an interior surface of the exterior body panel.

4. The door assembly of claim 1, further comprising a second inner panel, wherein:

the inner panel is a first inner panel that defines i) a cutout for a storage recess surrounded by the perimetral hinge support member of the perimetral hinge assembly, and ii) a slot for the perimetral hinge support member, and a second inner panel is configured to i) be received by the cutout and ii) define the storage recess.

5. The door assembly of claim 4, wherein the second inner panel comprises a pivoting or removable closure panel adapted to selectively cover the storage recess defined by the interior cover panel.

6. The door assembly of claim 1, wherein the one or more connection members are adapted to be coupled to a hinge mechanism coupled to a body of the vehicle.

7. The door assembly of claim 1, wherein the outer panel is further configured to conform with lines of the surrounding vehicle structure and enclose the storage compartment.

8. The door assembly of claim 1, wherein the perimetral hinge support member of the perimetral hinge assembly comprises a tubular structure with a relatively wider dimension parallel to the outer panel and the inner panel of the door assembly and a relatively thinner dimension perpendicular to the outer panel and the inner panel of the door assembly.

9. A perimetral hinge assembly for a door assembly for a vehicle, the perimetral hinge assembly comprising:

a perimetral hinge support member adapted to be disposed between and coupled to an outer panel and an inner panel of the door assembly about an outer periphery of the door assembly, wherein the inner panel defines a storage recess for a storage compartment on a side of the vehicle and is adapted to be surrounded by the perimetral hinge support member, the perimetral hinge assembly coupled to the vehicle to pivot the outer panel and the inner panel downward away from the storage compartment;

one or more connection members coupled to the perimetral hinge support member, wherein the one or more connection members are i) configured to protrude through a slot of the inner panel and ii) adapted to be coupled to a hinge mechanism coupled to a body of the vehicle; and a storage recess door coupled with the inner panel and adapted to selectively cover the storage recess, wherein:

in an open configuration, the storage recess door allows access to the storage recess, and in a closed configuration, the storage recess door encloses the storage recess.

10. The perimetral hinge assembly of claim 9, wherein the one or more connection members are disposed at an angle to the perimetral hinge support member.

11. The perimetral hinge assembly of claim 9, wherein the perimetral hinge support member comprises a tubular structure formed by a hydroforming process.

12. The perimetral hinge assembly of claim 9, wherein the perimetral hinge support member comprises a tubular structure with a relatively wider dimension parallel to the outer panel and the inner panel of the door assembly and a relatively thinner dimension perpendicular to the outer panel and the inner panel of the door assembly.

13. The perimetral hinge assembly of claim 9, wherein the outer panel comprises an exterior body panel of the vehicle and is configured to enclose a storage compartment on a side of the vehicle.

14. The perimetral hinge assembly of claim 13, wherein the outer panel further comprises an outer attachment panel coupled to an interior surface of the exterior body panel.

15. The perimetral hinge assembly of claim 9, wherein:

the perimetral hinge support member is adapted to be positioned between the inner panel and the outer panel, and a size and a position of the storage recess are constrained based on the perimetral hinge support member.

16. The perimetral hinge assembly of claim 9, wherein the inner panel comprises a pivoting or removable closure panel adapted to selectively cover the storage recess defined by the inner panel.

17. A door assembly for a vehicle, the door assembly comprising:

an outer panel configured to enclose a storage compartment on a side of the vehicle;

an inner panel comprising one or more sealing surfaces configured to engage corresponding sealing surfaces of the vehicle to seal and enclose the storage compartment; and a perimetral hinge assembly comprising:

a perimetral hinge support member disposed between and coupled to the outer panel and the inner panel, the perimetral hinge assembly hingedly coupled to the vehicle to pivot the outer panel and the inner panel downward away from the storage compartment, and a connection member coupled with the perimetral hinge support member and the vehicle, wherein in response to a load to the inner panel, the perimetral hinge support member is configured to transfer at least some of the load to the connection member.

18. The door assembly of claim 17, wherein in a closed configuration, the outer panel is further configured to conform with a surrounding vehicle structure and cover the storage compartment.

19. The door assembly of claim 18, further comprising a striker provided to secure the door assembly in the closed configuration.

20. The door assembly of claim 17, further comprising a door member that covers the inner panel.

* * * * *